United States Patent [19] [11] 4,091,677
Oshikubo [45] May 30, 1978

[54] PIPETTING APPARATUS

[75] Inventor: Yuji Oshikubo, Sakura, Japan

[73] Assignee: Nichiryo Co., Ltd., Tokyo, Japan

[21] Appl. No.: 754,030

[22] Filed: Dec. 23, 1976

[51] Int. Cl.² .......... G01N 1/14

[52] U.S. Cl. .......... 73/425.6; 128/218 P; 141/27

[58] Field of Search .......... 73/425.6, 425.4 P; 141/21, 27; 222/373; 128/218 P; 23/259

[56] References Cited

U.S. PATENT DOCUMENTS

| | | | |
|---|---|---|---|
| 1,671,814 | 5/1928 | Davenport | 222/373 |
| 1,921,411 | 8/1933 | Johann | 141/21 |
| 2,153,105 | 4/1939 | Szecsi | 73/425.6 X |
| 2,771,217 | 11/1956 | Brown et al. | 73/425.6 X |
| 2,994,349 | 8/1961 | Demos | 141/21 |
| 3,184,122 | 5/1965 | Nerenberg | 73/425.6 X |
| 3,217,761 | 11/1965 | Shapiro | 141/27 |
| 3,410,664 | 11/1968 | Fielding | 73/425.6 X |
| 3,732,735 | 5/1973 | Cohen | 73/425.6 |
| 3,869,068 | 3/1975 | Chen | 73/425.6 X |
| 3,963,061 | 6/1976 | Kenny | 141/21 |

FOREIGN PATENT DOCUMENTS

| | | | |
|---|---|---|---|
| 759,973 | 2/1934 | France | 141/27 |

*Primary Examiner*—Daniel M. Yasich
*Attorney, Agent, or Firm*—James E. Nilles

[57] ABSTRACT

A pipetting apparatus comprising a housing, a liquid receiving tube attached to the lower end of the housing and receiving a predetermined amount of a liquid sample therein, a cylinder piston device disposed in the housing for applying vacuum pressure on the upper end of the liquid receiving tube for sucking a liquid sample into the tube, a manually operable device for actuating the cylinder piston device, an air inlet for directing compressed air into the housing, and a manually operable valve for directing compressed air either to the upper end of the liquid receiving tube or to atmosphere.

5 Claims, 3 Drawing Figures

PIPETTING APPARATUS

BACKGROUND OF THE INVENTION

This invention relates to a pipetting apparatus and more particularly to a pipetting apparatus of the type which is called as a micro-pipetting apparatus that is adapted to dispence a predetermined small amount of liquid such as five to two hundred micro liters with a high degree of accuracy and reproducibility.

One of the prior art micro-pipetting apparatus includes a glass capillary tube having one or more scale lines on the middle portion thereof and a rubber tube attached to the upper end thereof. An operator of the apparatus places the free end of the rubber tube in his mouth and sucks the liquid sample into the capillary tube up to a predetermined scale line and, thereafter, blows the liquid sample out from the capillary tube. Although the apparatus is very simple in construction, it is difficult to assure that the liquid sample has been sucked accurately to the scale line and to blow out the liquid sample completely from the capillary tube, thus decreasing accuracy of the apparatus. Further, it sometimes occurs to mix saliva of the operator into the liquid sample in blowing out the liquid sample which deteriorates the quality of the sample, and to flow the liquid sample such as blood into the mouth of the operator in sucking up the liquid sample which might cause a bacterium infection.

Another prior art micro-pipetting apparatus comprises a cylinder-piston means incorporated in the apparatus which is manually operated for sucking up and ejecting out the liquid sample into and from a liquid receiving tube such as a glass capillary tube or the like attached to the lower end of the apparatus, but it has also been difficult to eject the liquid sample completely from the liquid receiving tube thus deteriorating the accuracy of the apparatus.

SUMMARY OF THE PRESENT INVENTION

An object of the present invention is to provide an improved micro-pipetting apparatus having an exceedingly high degree of accuracy and reproducibility which comprises a liquid receiving tube attached to the lower end of a housing of the apparatus for receiving a predetermined amount of liquid sample therein with an inlet-and-outlet opening at the lower end thereof, cylinder piston means disposed in the housing for applying vacuum pressure on the upper end of the liquid receiving tube in sucking the liquid sample therein, an operating device disposed on the upper end of the housing and adapted to be operated manually for operating the piston of the cylinder piston means, an air inlet connectable to a source of pressurized air, a normally closed first valve for controlling communication between the air inlet and the upper end of the liquid receiving tube, a valve operating device for operating the first valve, and a normally open second valve connecting the air inlet to atmosphere, the second valve is closed when the first valve is opened.

The source of pressurized air may have a very simple construction such as an electric motor driven air compressor without having pressure regulating valves or high pressure air tanks since the first and second valves open and close alternately.

Since the ejection of liquid sample is performed by pressurized air, the amount of residual liquid sample is decreased remarkably and, further, it is possible to mix the liquid sample with diluent or the like by continuing the supply of pressurized air after the liquid sample has been ejected from the liquid receiving tube.

BRIEF DESCRIPTION OF THE DRAWINGS

The present invention will be explained in more detail with reference to the accompanying drawings exemplifying the present invention, in which.

DESCRIPTION OF A PREFERRED EMBODIMENT

Figure 1:
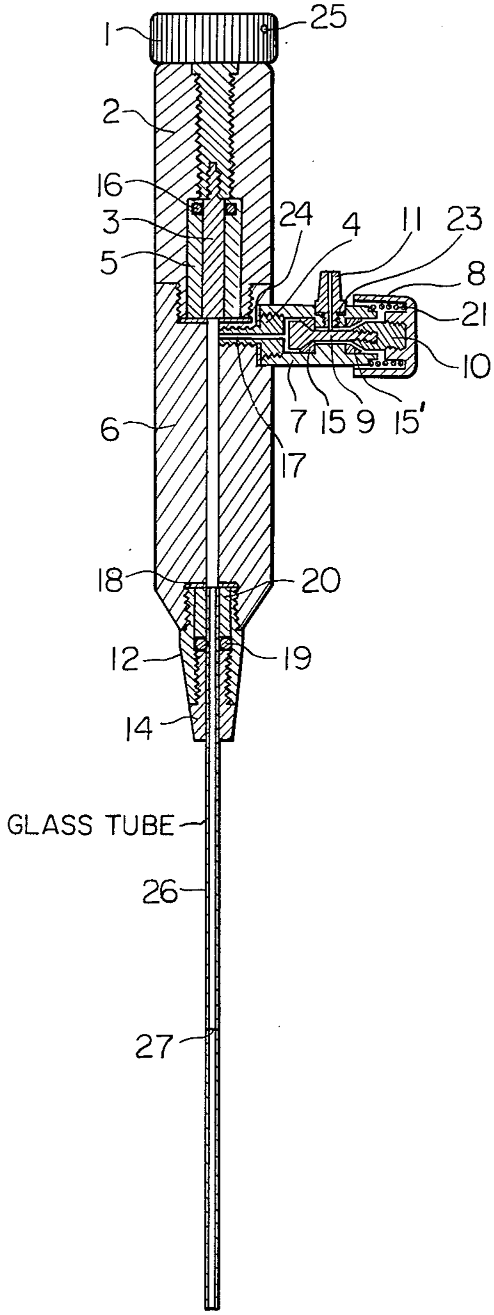
FIG. 1 is a longitudinal cross-sectional view of a pipetting apparatus according to the present invention.

The pipetting apparatus shown in FIG. 1 comprises a housing formed of an upper and a lower body 2, 6 screw threadingly connected with each other. An operating screw 1 engages with the upper body 2 in the upper end thereof and is adapted to be rotated by a finger for slidably moving a piston 3 upward or downward in a cylinder 5 which is disposed in the upper body 2. A glass capillary tube 26 having a scale line 27 on the middle portion thereof is attached to the lower end of the housing through connectors 12 and 14, a sleeve 20, and seals 18 and 19 as shown. The connector 14 and the seal 19 act to sealingly retain the glass tube 26. The bore of the glass tube 26 is precisely controlled and a predetermined volume is defined when liquid is filled up to the scale line 27.

A valve housing 7 is secured to the lower body 6 through a connector 4 and receives valve members 9 and 10 movably therein. The valve members 9 and 10 are integrally connected to a push button 8 and cooperate respectively with corresponding valve seats 15 and 15'. The push button 8 is urged rightward in the drawing by a compression spring 21 so that in normal inoperative condition shown in the drawing the valve member 9 constituting a first valve engages with corresponding valve seat 15 to cut off the communication between the glass tube 26 and an air inlet 17 formed in the connector 4 and adapted to be connected via nipple 11 to a source of compressed air (not shown) such as an electric motor driven air compressor or the like. At that condition the valve member 10 is separated from the corresponding valve seat 15' and the air inlet 4 is connected to atmosphere through the valve member 10 and its valve seat which constitute a second valve. When the push button 8 is depressed the second valve closes and the first valve opens.

In sucking the liquid sample the operating screw 1 is rotated by a finger so as to move the piston 3 upward in the cylinder 5, thus, sucking can be performed very simply and accurately. The liquid sample is ejected by depressing the push button 8 simply. Since the ejection of the liquid sample is performed by compressed air it is very quick and the residual liquid can be minimized. Further, when the liquid sample is ejected into a diluent as in the case of a blood test, it is possible to mix and stir the liquid sample and the diluent by continuing the depression of the push button 8 for a while, for example, about ten seconds.

Figure 2:
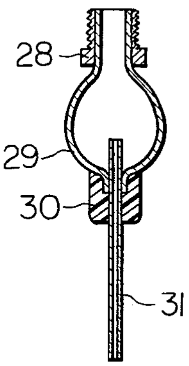
FIG. 2 is a cross-sectional view of a modified form of a liquid receiving tube and a device for connecting the tube to the pipetting apparatus of FIG. 1.

FIG. 2 shows a modified form of liquid receiving tube which is usually called as full length type, in which, the bore of a glass tube 31 defines a predetermined volume by its full length. The glass tube 31 is connected to the lower end of the lower body 6 of FIG. 1 by means of a connector 28, a glass bulb 29 and a sealing connector 30 formed of a synthetic resin or the like. Liquid drawn upwardly through glass tube 31 overflows out of the upper end thereof and is temporarily received in the chamber defined by glass bulb 29 and liquid also remains in the bore of glass tube 31.

Figure 3:
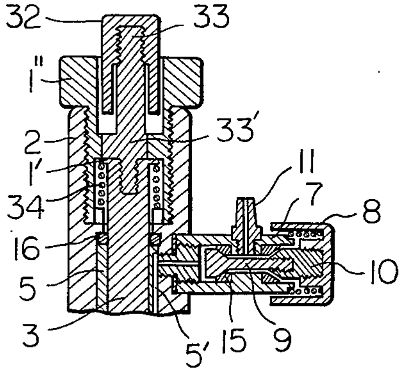
FIG. 3 is a partially broken cross-sectional view of a modified form of the pipetting apparatus of FIG. 1.

FIG. 3 shows a modified form of piston operating device in which an operating screw 1 is not connected to piston 3 directly, and the piston 3 is urged upward by a spring 34 against a shoulder 1' of the screw 1. An extension stem 33 is secured to the piston 3 and a screw cap 32 screw threadingly engages with the stem 33. A portion 33' of the stem 33 is of a non-circular cross-section and slidingly engages with a complementary shaped bore in the operating screw 1 preventing rotation of the stem 33 relative to the screw 1.

In the embodiment the valve housing for admitting a compressed air is secured to upper body 2 as shown, and a groove 5' is formed in the outer circumference of cylinder 5 for guiding compressed air downward in the housing. The push button 8 and the screw 1' can be operated easily as compared with the embodiment in FIG. 1 since the valve housing 7 is secured to the upper body 2 in the embodiment of FIG. 3.

The apparatus can be operated similarly as in the first embodiment and, further, by releasing the screw cap 33 from the depressed condition liquid sample can quickly be sucked into the glass tube and thereafter fine adjustment can be effected by rotating the screw 1 by a finger. Further, the screw cap 33 can be depressed and released several times after the liquid sample has been ejected into diluent by utilizing compressed air. Whereby residual liquid sample attached on the inner wall of the glass tube 26 or 31 can be washed off substantially completely by the diluent sucked into and ejected from the glass tube.

By utilizing flow of compressed air for ejecting the liquid sample from the glass tube, accuracy of about ±2% can be attached as compared with that of about ±5% in the prior art apparatus when a viscous liquid such as a blood is pipetted. When a diluent for the liquid sample is used to wash the inner wall of the liquid receiving tube as described in the embodiment of FIG. 3, it has been found that the accuracy of ±1% or less can be attained.

What is claimed is:

1. A pipetting apparatus comprising an elongated housing, a liquid receiving tube for receiving a predetermined amount of liquid therein and one end of which is attached to one end of said housing whereby said tube axially extends from said housing, cylinder piston means disposed in the housing adjacent the other end of said housing and in axial alignment with said tube for applying vacuum pressure on said one end of said tube to suck the liquid therein, a manually operable device for actuating said cylinder piston means and located in said other end of said housing and extending outwardly therefrom, an air inlet for being connected to a source of compressed air which is employed to discharge liquid from said tube, and a manually operable valve located in a valve housing extending laterally from said elongated housing for selectively communicating the air inlet with said one end of the liquid receiving tube to discharge liquid from said tube, said manually operable valve including two valve members co-axially and integrally disposed within said valve housing and connected to a push button, said valve members cooperating with two valve seats respectively, whereby when said push button is depressed to discharge liquid from said apparatus, one of said valve members engages its corresponding valve seat to cut off communication between said air inlet and atmosphere while the other valve member is separated from its corresponding valve seat to thereby communicate said air inlet with said one end of the liquid receiving tube whereby the liquid received in the liquid receiving tube is discharged quickly and thoroughly.

2. A pipetting apparatus according to claim 1, wherein the liquid receiving tube is a capillary tube having at least one scale line thereon.

3. A pipetting apparatus according to claim 1, wherein the liquid receiving tube is a capillary tube and the upper end of the glass capillary tube is connected to the housing through means defining a chamber therein for receiving temporarily a liquid overflowing out of the upper end of the liquid receiving tube.

4. A pipetting apparatus according to claim 1, wherein said manually operable device comprises an operating screw threadingly engaging with the other end of the housing and adapted to engage one end of a piston of said cylinder piston means, a spring biasing the piston against the operating screw, a depressing member projecting from said other end of the housing and through the operating screw for moving the piston against the force of said spring, and said operating screw being adjustable for controlling the movement of the depressing member relative to the operating screw.

5. The apparatus set forth in claim 1 further characterized in that said second housing has a nipple extending therefrom and said air inlet extends through said nipple.

* * * * *